Dec. 31, 1940.    J. A. LIGNIAN    2,226,622
LUBRICATING SYSTEM
Filed March 14, 1938    3 Sheets-Sheet 2

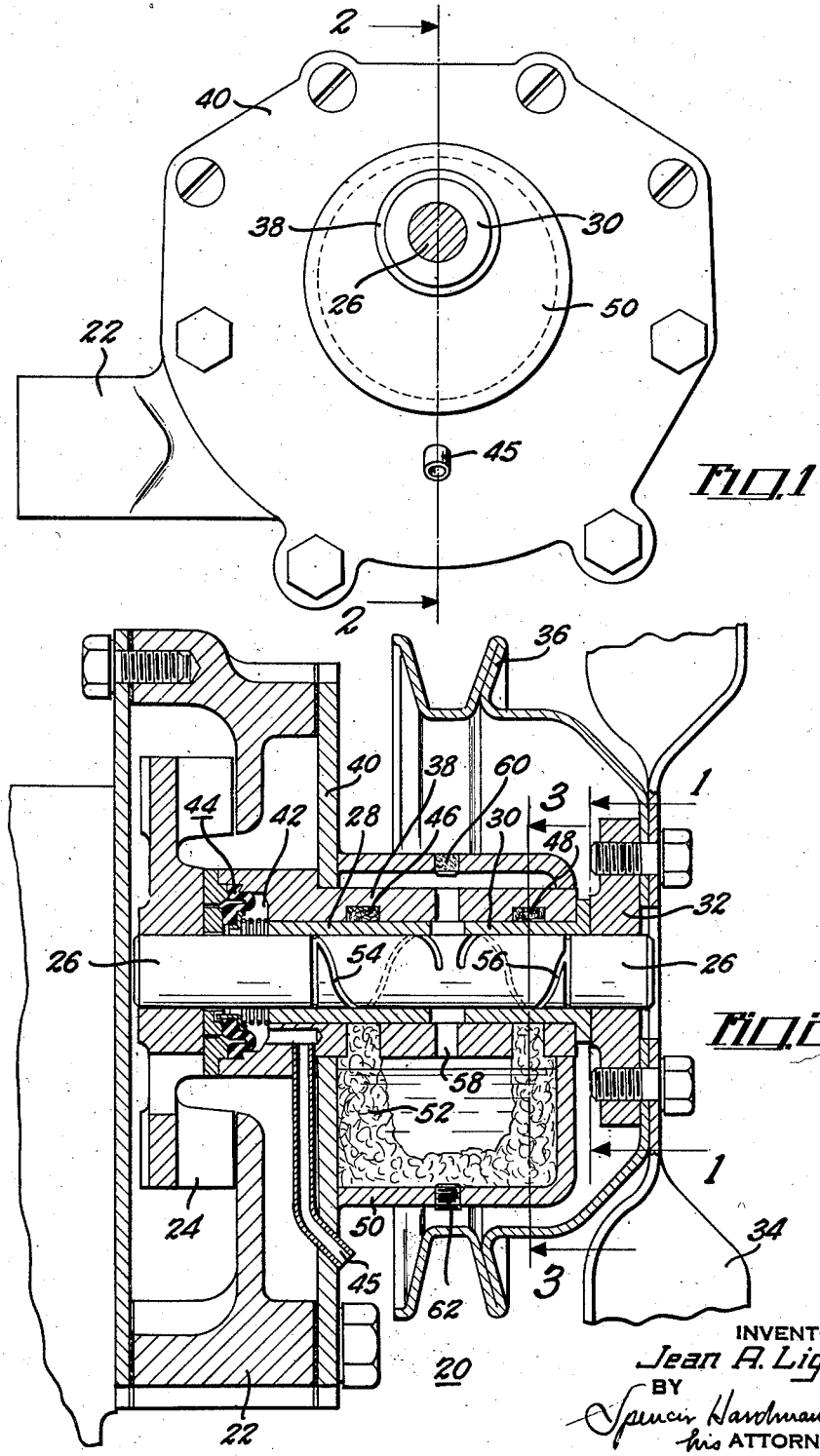

INVENTOR
Jean A. Lignian
BY
Spencer Hardman & Feber
his ATTORNEYS

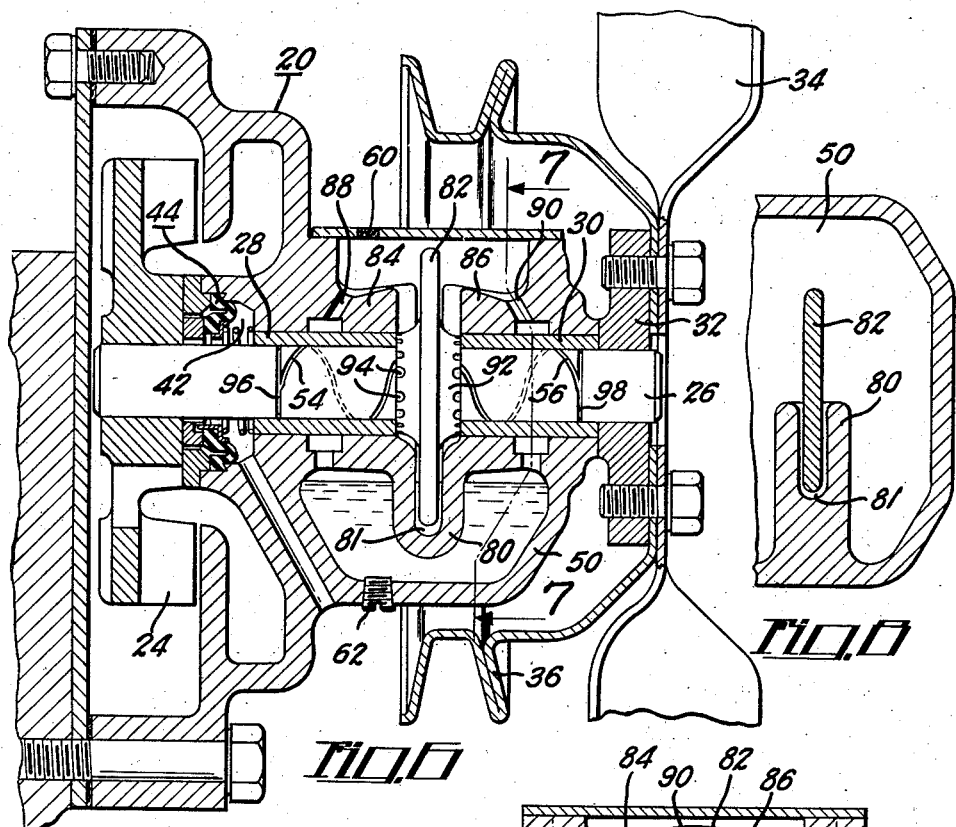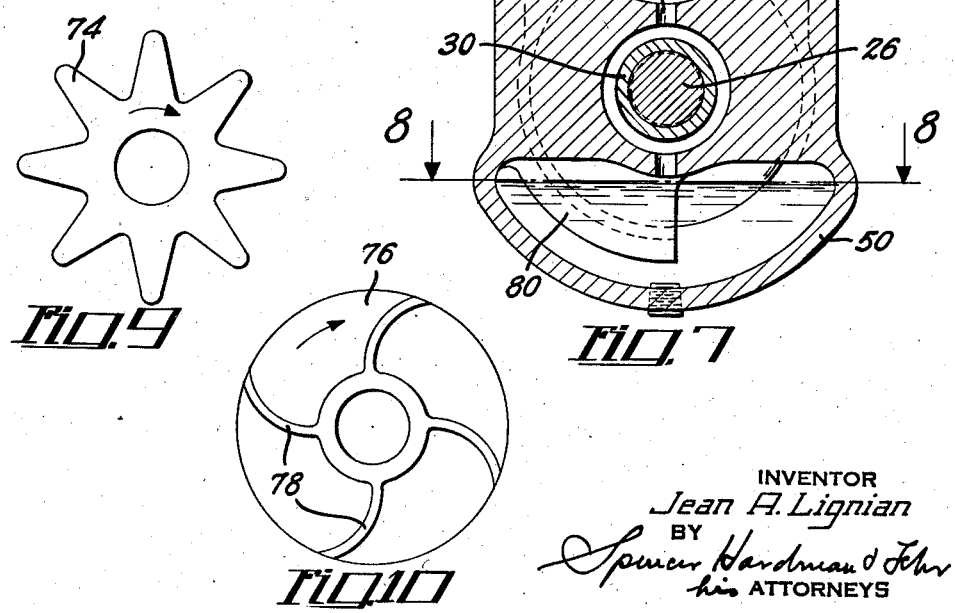

Patented Dec. 31, 1940

2,226,622

UNITED STATES PATENT OFFICE

2,226,622

LUBRICATING SYSTEM

Jean A. Lignian, Dayton, Ohio, assignor to General Motors Corporation, Detroit, Mich., a corporation of Delaware Application March 14, 1938, Serial No. 195,721

7 Claims. (Cl. 308—132)

This invention relates to lubricating systems and more particularly to lubricating systems for rotating bearing journals and the like.

It is an object of the present invention to provide a lubricating system for a bearing journal in which the bushing is fabricated from porous metal, an oil reservoir being provided for containing a supply of lubricant, and means also being provided for conveying the lubricant from said reservoir to the external surface of said bearing.

In carrying out the above object it is a still further object to provide a groove in the shaft that is journaled in said bushing or bearing, said groove conveying oil from the bearing surfaces to a point external of the bearing whence the oil may flow by gravity back to the reservoir.

Another object of the invention is to provide wicking as a means for conveying oil from the reservoir to the external surface of the bearing, said wicking conveying the oil by capillarity to the external bearing surface.

It is a still further object to utilize a wheel fastened to the shaft and partially immersed in the oil in the reservoir, said wheel upon rotation thereof collecting oil from the reservoir and then discharging the oil due to centrifugal force into ducts which communicate with the bearing surface by means of the bushing.

In carrying out the above object it is a still further object of the invention to provide a close fitting casing, or trough around a portion of said wheel, said casing extending into the oil in the reservoir and terminating at a point remote from the oil level therein, said casing aiding the wheel in collecting oil from the reservoir by creating a pumping action, whereby a greater supply of oil is centrifugally discharged from the wheel adjacent the oil ducts of the bearings.

In carrying out the above objects, it is a further object to utilize wheel designs of various types, for example, plain discs, star shaped wheels, or discs having curved ribs thereon which act as scoops for collecting oil etc.

It is a still further object of the invention, in some instances to seal the oil supply system from the atmosphere, a porous metal plug being provided at a point remote from the oil level in the reservoir for permitting breathing within the reservoir and thereby equalizing the pressure within the reservoir with respect to the atmospheric pressure.

Further objects and advantages of the present invention will be apparent from the following description, reference being had to the accompanying drawings wherein preferred embodiments of the present invention are clearly shown.

In the drawings:

Fig. 1 is an external side elevation of an automotive water pump taken on line 1—1 of Fig. 2.

Fig. 2 is a sectional view taken on line 2—2 of Fig. 1 illustrating one form of the present lubricating system as applied to an automotive water pump.

Fig. 6 is a sectional view illustrating another embodiment of lubricating system as applied to a water pump.

Fig. 7 is a sectional view taken on line 7—7 of Fig. 6.

Fig. 8 is a sectional view taken on line 8—8 of Fig. 7, and

Figs. 9 and 10 are modified designs of oil wheels used in connection with the lubricating systems shown in Figs. 4 and 6.

Figure 3:
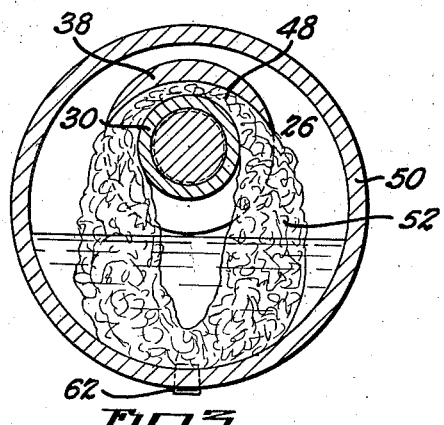
Fig. 3 is a sectional view taken on the line 3—3 of Fig. 2 illustrating the position of the wicking with respect to the journals.
Figure 5:
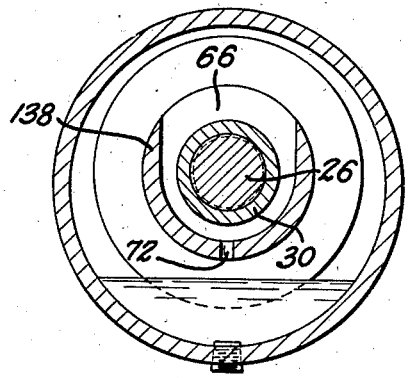
Fig. 5 is a sectional view taken on the line 5—5 of Fig. 4.

Referring to the drawings a lubricating system is illustrated as applied to a conventional type of water pump 20 such as is utilized in connection with an internal combustion engine of the automotive type. Fig. 2 shows a section through the water pump 20 which includes a housing member 22 that is chambered to suit the pump design and accommodate an impeller 24 carried by the inner end of a shaft 26. The shaft 26 is journaled in bushings 28 and 30 that are fabricated with porous bronze which may be material made in accordance with the disclosure in the Williams Patent No. 1,556,658, patented October 13, 1925. The outer end of shaft 26 carries a hub 32 to which is bolted a fan 34 and a pulley 36.

The bushings 28 and 30 are supported and carried by a bushing support 38 which is fastened or cast to a plate 40 that in turn is bolted to the housing member 22. The inner end of support 38 has a cavity 42 formed therein that accommodates a fluid seal arrangement 44 used to prevent water from the pump housing from seeping along the shaft 26. A tube 45 connects the cavity 42 with the atmosphere to prevent a vacuum from forming therein. The support 38 is undercut around the bore thereof to form channels 46 and 48, the undercut channel portions 46 and 48 surrounding the bushings 28 and 30 preferably adjacent the center portions thereof. An annular cup-shaped reservoir 50 is disposed around the support to enclose the same and is preferably cast or welded thereto at the outer end thereof and likewise is cast or welded to the plate 40 at the inner end thereof. The cup 50 forms an oil reservoir which is used to carry lubricant for the bearings. Adjacent the lower portion of the undercut channels 46 and 48 communication is provided with the reservoir as noted in Fig. 3. Wicking 52 of any suitable type is passed through the channels 46 and 48 so as to partially surround the bearings 28 and 30 and to also hang down into the bottom of the reservoir 50 beneath the oil level therein. Oil within the reservoir is conveyed by capillarity by the wick 52 to the external surface of the bushings 28 and 30. This oil is then absorbed by the porous metal of the bushings and conveyed therethrough by capillarity within the intercommunicating pores of the porous metal and is then exuded at the bearing surfaces of the bushings.

In the preferred form spiral grooves 54 and 56 turned in reverse directions in the shaft 26 are provided for conveying excess lubricant from the bearing surfaces to a point adjacent the center of the support 38. At this point a communicating passage 58 is provided so that the oil conveyed thereto by the grooves 54 and 56 may drop by gravity through passage 58 back into the reservoir. In this manner substantially no oil is lost from the lubricating system, since the oil does not tend to seep out of the bushings adjacent the ends thereof external of the reservoir due to the surface tension of the oil.

A highly porous metal plug 60 is preferably located adjacent the top of the reservoir 50 and acts as a breather as well as a strainer for preventing the ingress of dirt or dust into the reservoir. In this manner the pressures within the reservoir 50 are equalized with respect to atmospheric pressures due to the restricted passage of air through the porous metal plug 60 without the ingress of any foreign matter thereto. A second plug 62 of non-porous metal may also be provided preferably adjacent the bottom of the reservoir through which the reservoir may be initially charged with lubricant and through which oil sludge may be withdrawn.

Figure 4:
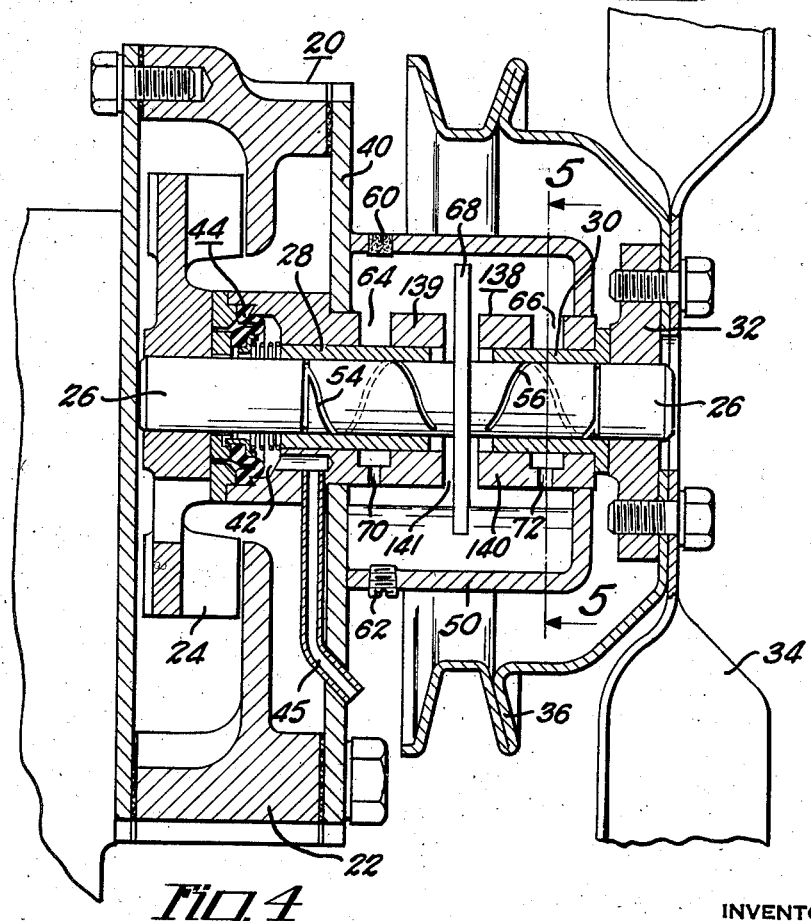
Fig. 4 is a sectional view of a modified design of the lubricating system illustrated in Fig. 2.

Referring to Fig. 4 a modified design of the present lubricating system is shown wherein a support 138 is provided having ducts 64 and 66 communicating with the external surfaces of the bushings 28 and 30. The support 138 is not continuous throughout the reservoir 50 but is formed in two portions 139 and 140 terminating a spaced distance apart adjacent the middle of the reservoir as at 141. Within the space 141 between the inner ends of support 138 and fastened to the shaft 26 is a discoidal wheel 68 which may be metallic or may be formed from some non-metallic material such as Bakelite or hard rubber. The wheel 68 is partially immersed in the oil in the reservoir 50 and when the shaft 26 and wheel 68 rotate, a portion of the oil from the reservoir adheres to the wheel and is carried upwardly. When the wheel 68 is rotating at normal speeds oil is thrown therefrom by centrifugal force adjacent the upper part of the reservoir and then runs downwardly through the ducts 64 and 66 around the bushings 28 and 30. Excess oil in ducts 64 and 66 drains back into the reservoir 50 through small apertures 70 72 positioned adjacent the lowest portion of the ducts 64 and 66 respectively. It is, therefore, apparent that the present embodiment of the invention utilizing the rotating wheel, provides a continuous supply of oil to the ducts 64 and 68 whenever the shaft 26 and wheel 68 attached thereto are rotating. The grooves 54 and 56 in shaft 26 have a similar function to that already explained in connection with Fig. 2.

Instead of a solid discoidal wheel such as 68, a star shaped wheel 74 may be used as shown in Fig. 9, or a disc 76, having curved ribs 78 on the vertical faces thereof, such as is shown in Fig. 10 may be utilized. The disc as shown in Fig. 10 promotes a scooping action when rotated to the right and therefore carries a greater amount of oil upwardly to the lubricating ducts.

Another embodiment of the invention is shown in Fig. 6. In this modification a close fitting casing 80 is provided around a portion of a disc 82. The casing 80 is preferably cast integral with a support 84 and forms a deep trough 81 which is immersed within the oil at one end thereof. The disc 82 rotating within casing 80 has but a slight clearance with the walls thereof and therefore during rotation thereof creates a slight vacuum within the trough 81 which draws the oil from the reservoir upwardly within the trough, whence it is exhausted centrifugally by the disc into an upper portion 86 of the reservoir 50 which communicates by means of ducts 88 and 90 with the outer surface of the bushings 28 to 30; the construction of the casing 80 may be noted by referring to the sectional drawings Figs. 7 and 8.

The hub portion 92 of the disc 82 is preferably a close fit between the ends of the bearings 28 and 30 and is castellated at either end thereof as at 94 to permit oil from the shaft grooves 54 and 56 to seep therethrough and drain back to the reservoir.

It will be noted in all the embodiments that the outer ends of the shaft grooves 54 and 56 preferably terminate in annular grooves 96 and 98 respectively. These annular grooves 96 and 98 cooperate with the surface tension effect of the oil to prevent loss of oil at the ends of the shaft, in this manner substantially all the oil at the bearing surfaces, which is not used for lubrication purposes, is carried by the spiral grooves 54 and 56 to the center portion of the bushing support whence the oil drains back to the reservoir.

From the foregoing it will be observed, that I have provided a substantially life time lubricated system which requires but one charge of lubricant to maintain the same in proper operating condition for long periods of time. The porous metal bearings 28 and 30 provide sufficient oil flow therethrough to properly lubricate the shaft 26 and, due to the numerous design features embodied in the structure shown, substantially no oil is lost from the system at any time. The wicking 52 and discs 58 and 82 have the common function of supplying oil to the external surfaces of the bushings whereby the bushings maintain the shaft lubricated at its journals. For purposes of definition the entire space included within the cup 50 is termed the oil reservoir and it will be noted that in all the embodiments herein disclosed that the bushings are so disposed that the inner ends thereof terminate within the oil reservoir while the outer ends thereof terminate externally of the reservoir.

In a lubrication system a certain quantity of sludge and dirt is inevitable. In all the present designs the reservoir 50 is designed that this sludge may settle to the bottom thereof and remain undisturbed and not be recirculated and thus cause partial closure of the pores of the bushings. In the designs illustrated in Figs. 2 and 4 the reservoirs etc. are fabricated from sheet metal welded together to form an oil tight closure. Obviously, these designs could be fabricated from cast metal as is the assembly illustrated in Fig. 6.

While the present lubricating system is shown in connection with an automotive water pump it is apparent that similar expedients could be satisfactorily applied to numerous applications wherein long periods of unattended lubrication of the bearing journals are desired.

The system including the wheel type of lubricator may also be used in connection with non-porous bushings. In this case an oil hole or duct is bored through the bushing and communicates with the bearing surface.

While the embodiments of the present invention as herein disclosed, constitutes preferred forms, it is to be understood that other forms might be adopted, all coming within the scope of the claims which follow.

What is claimed is as follows:

1. A lubricating system for a bushing including in combination, a porous metal bushing, a support for said bushing, a horizontal shaft journaled in said bushing, an oil duct in said support and communicating with the external surface of the supported bushing, an oil reservoir; a wheel carried by said shaft and non-rotatable with respect thereto, a trough enclosing a part only of the wheel and having one end thereof immersed in the oil in said reservoir, said trough being a close fit around the wheel, said wheel creating a vacuum within said trough during rotation of the wheel for aiding the wheel in collecting oil from said reservoir, said wheel throwing the oil centrifugally into said oil duct, whereby the oil is exuded by capillarity within the pores of the bushing at the bearing surface thereof, and means including a groove on said shaft for returning excess oil at the bearing surface back to said reservoir.

2. In a sealed lubricating system for a shaft journal the combination of a bushing formed from porous bronze, a bushing support having an oil groove therein communicating with the external surface of the bushing, a horizontal shaft journaled within the bushing and rotatable with respect thereto, a sealed oil reservoir adjacent and below the bushing support, means extending into the oil within said reservoir for conveying the oil upwardly into said oil duct whereby oil is absorbed by said porous bushing and exuded at the bearing surface thereof, a spiral groove cut on the surface of said shaft on the portion thereof which is journaled in the bushing, said groove being disposed so as to carry excess oil from the bearing surface along the shaft and discharge the same into said reservoir, and a porous metal breather plug in said reservoir and above the oil level therein for equalizing the pressure within said reservoir.

3. In a sheet metal water pump assembly, the combination of a sheet metal oil reservoir, a bushing support welded within said reservoir, a bushing held in said support, said bushing being fabricated from porous bronze, a rotatable shaft journaled within said bushing, an oil duct within said support and extending peripherally around the bushing, wicking disposed within said duct and around the bushing and extending into the oil reservoir, for conveying the oil from said reservoir by capillarity to said oil duct and thereby lubricating the bearing surface of the bushing, by capillary flow through said bushing, a spiral groove on the surface of said shaft and substantially within the bushing for conveying excess oil at the bearing surface to said reservoir and a porous metal breather plug in said reservoir and above the oil level therein for equalizing the pressure within said reservoir.

4. A sealed lubricating system for a bushing including in combination; a porous metal bushing, a support for said bushing, a horizontal shaft journaled in said bushing, an oil duct in said support and communicating with the external surface of the supported bushing, an oil reservoir, means for conveying oil upwardly from said reservoir to said oil duct, whereby the oil is exuded by capillarity within the pores of the bushing at the bearing surface thereof, means including a groove in said shaft for returning excess oil at the bearing surface back to said reservoir, and a highly porous metal plug positioned in a wall of said reservoir and above the oil level therein for equalizing air pressures within the reservoir.

5. A sealed lubricating system for a bushing including in combination; a porous metal bushing, a support for said bushing, a shaft journaled in said bushing, an oil duct in said support and communicating with the external surface of the supported bushing, an oil reservoir, a wheel carried by said shaft and non-rotatable with respect thereto, said wheel upon rotation thereof collecting oil from said reservoir and then exhausting the oil centrifugally into said oil duct whereby the oil is exuded by capillarity within the pores of the bushing at the bearing surface thereof, means including a groove in said shaft for returning excess oil at the bearing surface back to said reservoir, and a highly porous metal plug positioned in a wall of said reservoir and above the oil level therein for equalizing air pressures within the reservoir.

6. A sealed lubricating system for a bushing including in combination, a porous metal bushing, a support for said bushing, a horizontal shaft journaled in said bushing, an oil duct in said support and communicating with the external surface of the supported bushing, an oil reservoir; a wheel carried by said shaft and non-rotatable with respect thereto, a trough enclosing a part only of the wheel and having one end thereof immersed in the oil in said reservoir, said trough being a close fit around the wheel, said wheel creating a vacuum within said trough during rotation of the wheel for aiding the wheel in collecting oil from said reservoir, said wheel throwing the oil centrifugally into said oil duct, whereby the oil is exuded by capillarity within the pores of the bushing at the bearing surface thereof, means including a groove on said shaft for returning excess oil at the bearing surface back to said reservoir.

7. A sealed lubricating system for porous metal bushings including in combination; a sheet metal enclosure adapted to form a reservoir for oil in a part thereof, an annular sheet metal support welded in said enclosure with the bore thereof in register with a pair of apertures in the enclosure and so as to be fluid tight therewith, a porous metal bushing adapted to be pressed fitted into said annular sheet metal support, a shaft adapted to be journalled in said bushing, means for conveying oil from said reservoir to the outer surface of said bushing, whereby the shaft is lubricated due to capillary flow of the oil through the porous structure of the bushing, and a highly porous metal breather plug adapted to be inserted in said enclosure above the oil level in the reservoir portion thereof whereby the pressures within the reservoir are equalized with atmospheric pressure through said breather plug.

JEAN A. LIGNIAN.